US005776586A

United States Patent [19]

Lipper

[11] Patent Number: 5,776,586

[45] Date of Patent: Jul. 7, 1998

[54] PROMOTIONAL HANG-TAG WITH INTEGRAL REMOVABLE TATTOO

[76] Inventor: Chris Lipper, 10591 Topsfield Dr., Cockeysville, Md. 21131

[21] Appl. No.: 914,128

[22] Filed: Jul. 19, 1997

Related U.S. Application Data

[63] Continuation-in-part of Ser. No. 621,469, Mar. 26, 1996.

[51] Int. Cl.[6] .......... B32B 3/00

[52] U.S. Cl. .......... 428/195; 428/40.1; 428/192; 428/411.1; 428/488.4; 428/914

[58] Field of Search .......... 428/192, 195, 428/13, 411.1, 914, 40.1, 488.4; 283/74, 75

[56] References Cited

U.S. PATENT DOCUMENTS

| | | | |
|---|---|---|---|
| 4,200,222 | 4/1980 | Feur | 229/92.8 |
| 4,340,810 | 7/1982 | Glass | 235/375 |
| 4,439,941 | 4/1984 | Halperin | 40/124.1 |
| 4,516,793 | 5/1985 | Kiyokane | 283/103 |
| 4,594,276 | 6/1986 | Relyea | 428/40 |
| 4,634,849 | 1/1987 | Klingen | 235/487 |
| 4,899,882 | 2/1990 | Benner | 206/470 |
| 5,538,289 | 7/1996 | Cassis, III | 283/74 |

*Primary Examiner*—William Krynski

*Attorney, Agent, or Firm*—Law Offices of Royal W. Craig

[57] ABSTRACT

A hang-tag for clothing and the like that includes an integral removable tattoo for promotional purposes. The integral tattoo is formed on a multi-layer-paper backing that is attached to the hang-tag by special pressure sensitive adhesive. The tattoo also includes a water soluble slip layer, a waterproof film coating, and an offset printed design such as a corporate logo, all carried on the backing. The hang-tag is a convenient means of securing information regarding product promotion, pricing, and manufacturing to clothing accessories. The integral tattoo gives the retailer the capability of adding a promotional logo or the like at a greatly reduced cost compared to present methods. It is also likely that the tattoo will be removed and applied elsewhere, thereby generating further publicity.

8 Claims, 5 Drawing Sheets

PROMOTIONAL HANG-TAG WITH INTEGRAL REMOVABLE TATTOO

BACKGROUND OF THE INVENTION

This application is a Continuation-in-Part of U.S. patent application Ser. No. 08/621,469 entitled "PROMOTIONAL HANG-TAG WITH INTEGRAL REMOVEABLE TATTOO" to Lipper, filed on Mar. 26, 1996, pending.

1. Field of the Invention

The present invention relates to hang-tags for attachment to clothing and other articles for securing information regarding product promotion, pricing, and manufacturing thereto, and more particularly to a hang-tag that carries an integral removable tattoo for further promotional purposes.

2. Description of the Background

The marketing of clothing, accessories and other products compels the liberal use of labels. Both manufacturers and retailers would like to label their products with colorful attention-grabbing labels including advertisements and promotions, size information, names, logos, pricing, etc. Moreover, they often need to provide detailed product information such as material composition to customers (this is often mandated by law, depending on the product).

There are a wide variety of commercially available hang-tags for accomplishing the above-described purpose for clothing, accessories, and other articles. Hang-tags are a useful means for conveying promotional material and/or necessary information. The typical hang-tag is a simple piece of card-stock (which may be folded) and which is attached to a garment or other product by a "swifttack" (i.e., a looped plastic fastener applied by a gun), or a string or cord threaded through the top of the tag.

Unfortunately, currently available hang-tags and attachment techniques are limited in effectiveness. First of all, they are somewhat mundane and unnoticeable since they carry only text and graphics, and especially since the potential customer is more after the garment than the information on the hang-tag. In consequence of the above, most hang-tags are discarded without ever being read. Of course, once discarded, the promotional value of the hang-tag is lost. Secondly, hang-tags are commonly attached at the manufacturer and do not provide the retailer with any opportunity to convey promotional information. Any attempt to add additional hang-tags or supplement the existing hang-tags results in excessive costs.

Accordingly, a need exists for an economical, convenient means of enhancing a conventional hang-tag so that it becomes exciting and eye-catching, thereby compelling notice by potential customers, serving as a closer, and increasing sales. Furthermore, there is a need to provide the retailer with an opportunity to convey promotional information, even though the hang-tag may be attached at the manufacturer. Any enhancement or supplement to an existing hang-tag must leave sufficient space for advertising and promotions, consumer product information, and pricing information, and it must not significantly raise the cost.

There now exists a process for making improved removable tattoos by securing an extremely thin, flexible and extensible design closely simulating an actual tattoo. Specifically, U.S. Pat. No. 4,522,864 issued Jun. 11, 1985 to Humason et al. discloses "Decals and Process for Making Same". The disclosed removable tattoos include a multi-layer-paper backing, water soluble slip layer, waterproof film coating, lithograph offset printed design, and transparent pressure sensitive adhesive. removable tattoos of this type appear very bright, exciting and eye-catching. It would be greatly advantageous to combine such removable tattoos in hang-tags in an economical way so as to make the hang-tag more compelling, and to offer the tattoo as a "G.W.P." (i.e., gift with purchase). Given a choice between a product with a conventional hang-tag and one with an integral removable tattoo, a consumer will more often choose the latter. This is especially true with licensed products, e.g., an NFL licensee selling Dallas Cowboy® sweatshirts with Cowboy logos would increase market share by incorporating a Dallas Cowboy® tattoo. Moreover, by making the tattoo detachable, the promotional value of the hang-tag would be propagated by the tattoo even after the tag has been removed and/or discarded. The removable tattoo could be attached at the sweatshirt factory at minimal additional cost.

Of course, any enhancement or supplement to an existing hang-tag must leave sufficient space for advertising, consumer product information, and pricing information, and it must not significantly raise the cost.

SUMMARY OF THE INVENTION

In accordance with the above, it is an object of the present invention to provide a simple, inexpensive and convenient enhancement to a conventional hang-tag so that it becomes more stimulating and eye-catching, thereby compelling notice by potential customers. The improved hang-tag includes an integral removable tattoo that is intended to influence consumers to purchase the attached product over competing products with conventional hang-tags.

It is another object to provide a hang-tag with a lasting promotional impact, even after the tag has been removed and/or discarded.

It is still another object to allow retailers to add a supplement into the conventional hang-tag in order to provide them with an opportunity to convey their own promotional information, even though the hang-tag may be attached at the manufacturer.

According to the present invention, the above-described and other objects are accomplished by providing a promotional hang-tag with integral removable tattoo. The hang-tag includes a cardboard sheet (varnished or not) having a surface bearing pre-printed subject matter such as manufacturer advertising and/or other promotional information. The cardboard sheet is perforated with at least one through hole which may receive a "swifttack" (i.e., a looped plastic fastener applied by a gun), or a string, cord, or any similar device threaded through the top of the tag. The cardboard sheet may then be hung from any intended product by looping the swiftack, string, cord, or other similar device around the product. A temporary tattoo is removably attached to the cardboard sheet. Though the tattoo may conceivably be constructed in other ways, the presently preferred tattoo includes a panel of porous decal paper, a water soluble slip layer carried on the porous decal paper, a water resistant film carried on the water soluble slip layer, secondary subject matter such as retailer advertising printed on the water resistant film, and a layer of pressure sensitive adhesive covering the printed secondary subject matter. The temporary tattoo is removably attached to the cardboard sheet with a reattachable bonding agent (which may be in glue or tape form). The hang-tag is intended for conveying information regarding product promotion, pricing, and/or manufacturing, and the removable tattoo may be removed and applied elsewhere, thereby generating further publicity. The tattoo also adds the capability of conveying supplemental information such as retailer advertising.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DESCRIPTION OF THE PREFERRED EMBODIMENTS

Figure 1:
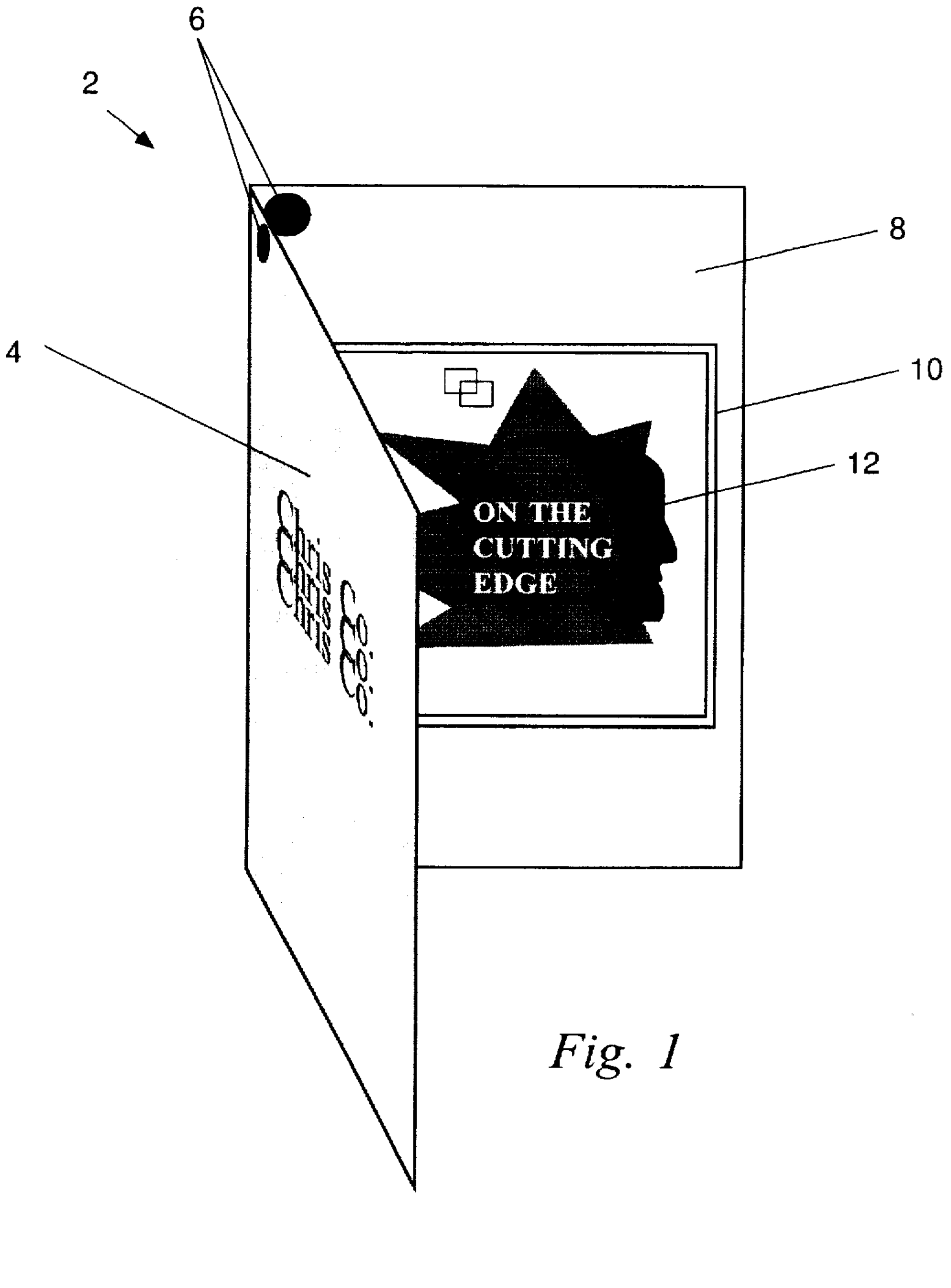
FIG. 1 is a front perspective view of an exemplary folded hang-tag 2 with integral temporary tattoo 10 according to one embodiment of the present invention.

FIG. 1 is a front perspective view of an exemplary folding hang-tag 2 with integral temporary tattoo 10 according to one embodiment of the present invention.

The hang-tag 2 of the present invention provides an economical and convenient means of securing information regarding product promotion, pricing, and manufacturing to products such as clothing and accessories. hang-tag 2 is formed of conventional cardstock and is folded vertically in the manner of a greeting card. The front panel 4 may be printed and/or embossed to convey promotional information, consumer product information, and/or pricing information. The hang-tag 2 is perforated with holes 6 through the folded upper corner to allow the tag 2 to be hung by from the intended product by a "swifttack" (i.e., a looped plastic fastener applied by a gun), or a string, cord, thread, or other similar device inserted through the top of the tag. Typically, the hang-tag 2 and the information borne thereon are provided by the manufacturer of the product to which the hang-tag 2 will be attached. The identity of the retailer generally is not known until the hang-tag is attached and the product is packaged and shipped. Hence, the printed promotional information is specific to the manufacturer. A need exists for an economical way of giving the retailer an opportunity to add promotional information. On the other hand, any enhancement or supplement to an existing hang-tag must leave sufficient space for consumer product information and pricing information, and it must not significantly raise the cost. These and other objects are accomplished by incorporating a removable tattoo 10 bearing supplemental information and/or a second design such as the retailer's logo 12. The interior of hang-tag 2 is defined by opposing panels, and the removable tattoo 10 bearing the second design such as a logo 12 is removably attached to one panel 8.

Figure 2:
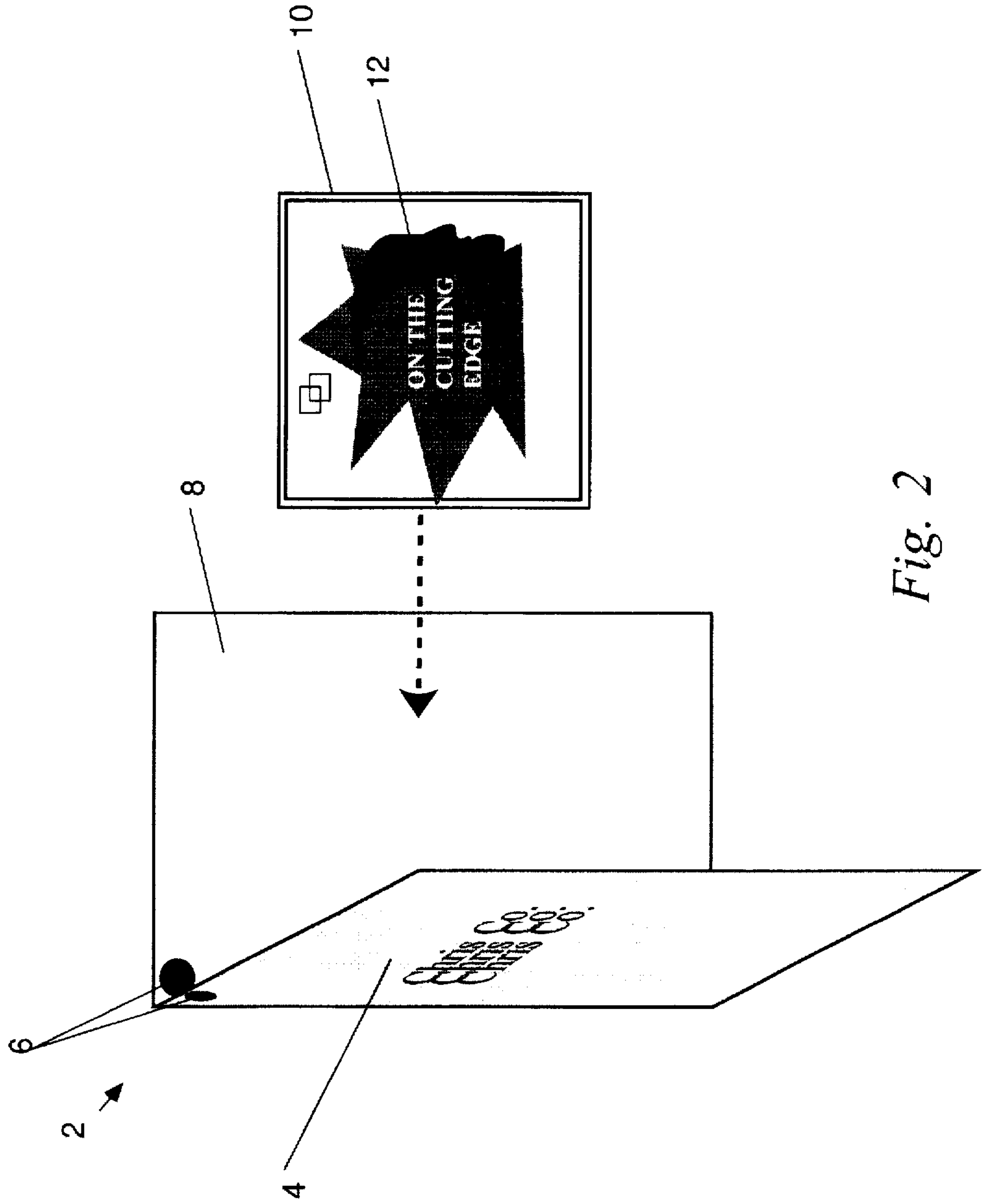
FIG. 2 is a break-away perspective drawing showing the temporary tattoo 10 removed from the folded hang-tag.

FIG. 2 is a break-away perspective drawing showing the temporary tattoo 10 removed from the folded hang-tag 2. The layers of the temporary tattoo include a base piece of decal paper (to be described) which is preferably glued to the one side 8 of the interior of hang-tag 2 using a specialized reattachable (and preferably non-toxic) bonding agent such as that which is commercially available from 3M Corporation®. The tattoo 10 is of simple and inexpensive design and allows the attachment of an extremely thin and flexible design logo or the like (e.g., the retailer's logo 12) to a flat surface such as skin in order to simulate an actual tattoo. Nevertheless the tattoo 10 leaves sufficient space for consumer product and pricing information. Most importantly, tattoo 10 does not significantly raise the cost. It has been calculated that a hang-tag 2 with tattoo according to the present invention can be produced for about 7–8 cents each. In contrast, a twice-printed hang-tag or one incorporating some other inserted means of conveying retail information, e.g. a drop-card or adhesive foil decal, would cost between 10–15 cents each.

Figure 3:
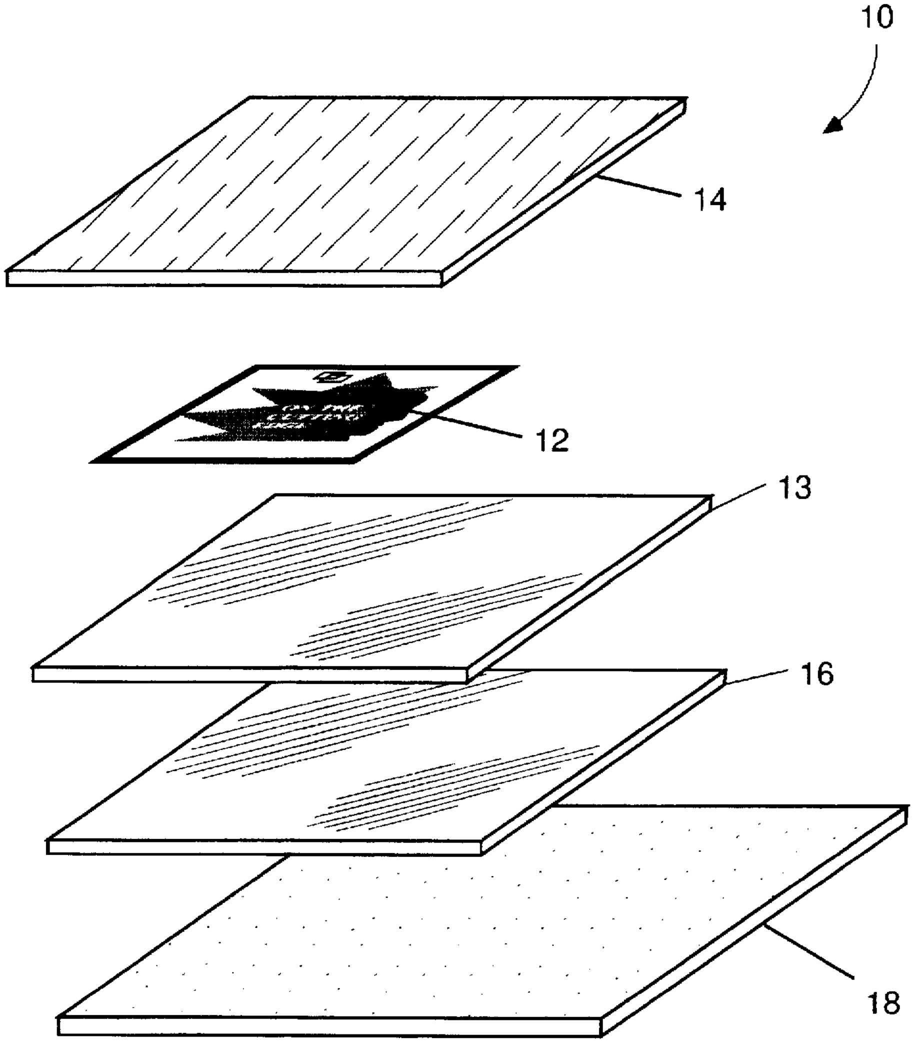
FIG. 3 is a side perspective drawing of the temporary tattoo 10 with various layers exposed.

FIG. 3 is a side perspective drawing of the temporary tattoo 10 with various layers exposed.

As seen in FIG. 3, the tattoo 10 used in the present invention is a multi-color offset print logo 12 on an extremely thin, flexible, extensible film of water resistant material 13, which in turn covers a water soluble slip layer 16 carried on porous decal paper 18.

A uniform deposit of pressure sensitive adhesive 14 covers the design logo 12 and is adapted to hold the design against the surface to which it will be applied, and to protect it from disruption during application.

The tattoo incorporated in the present invention as shown in FIG. 3 lends itself to application to any flat surface including skin, and it closely simulates an actual tattoo by virtue of its extremely thin, flexible, extensible, matte surfaced film 13. A multi-color offset lithograph logo 12 (or other design) is imprinted on film 13. Printed logo 12 comprises an extremely thin application of colored ink (or multiple applications for different colors) to thin film 13. Pressure sensitive adhesive layer 14 is deposited on top of logo 12 (on its printed side), and the above layers are supported by a water soluble slip layer 16 carried by decal paper 18. Pressure sensitive adhesive layer 14 stays dry and is not tacky prior to application of the decal to the skin. Thus, when the tattoo 10 is applied inside hang tag 2 (in FIG. 1), there is no adhesion of the pressure sensitive adhesive when contacted by the back side of front panel 4 (of FIG. 1).

The film 13 and imprinted design 12 are preferably as thin as possible. The decal paper 18 and slip layer 16 protect the film 13 and lithograph design 12 until they are actually applied (e.g., to the skin of the user). The pressure sensitive adhesive 14 enables the printed film 13 to be secured in place while its integrity is protected by the decal paper 18. Thereafter, the pressure sensitive adhesive layer 14 adheres the film 13 and multi-color lithographed design 12 against the user's skin so that it is not disrupted during wetting and removing the paper 18 and slip layer 16, or during wiping off of any residual material. Further, the film 13 protects the printed design 12 during the time it is in place on the user's skin so that the skin surface and applied film 13 and design 12 may be washed (it will withstand mild detergents such as soap). The film 13 and design 12 may be removed when desired using an appropriate stronger solvent. Extreme thinness of the film 13 and lithographed design 12 are important to make the film 13 less noticeable and to obtain a true appearance of a tattoo (whereby the color of the skin beneath the tattoo shows through and the design 12 seems to be part of the skin to which it is affixed). The thinness is also necessary to enable the film 13 and design 12 to flex and stretch with the skin 20 without cracking and to minimize stresses tending to separate the film 13 and design 12 from the skin 20 through disruption of the pressure sensitive adhesive bond to the skin.

The design 12 is preferably formed by a multi-color offset lithograph process, thereby insuring a colorful attention-grabbing logo advertisement. Slip layer 16 is formed by spraying or otherwise applying a coating comprising a solution of water soluble material to the base sheet of decal paper 18, and then drying slip layer 16. The area of decal paper 18 coated by slip layer 16 is preferably limited to the area which will receive the design 12. Thereafter, the coated area and, preferably the remaining area of decal paper 18 are coated lithographically with a very thin film 13 of a water resistant, flexible, extensible material. The film is microscopically thin, preferably no thicker than necessary to resist penetration of water to the slip layer 16 and paper 18. A suitable film material is the material commercially available as a standard "offset overprint varnish" but other natural or synthetic materials such as, resin solutions having the necessary covering and water resistant properties may be used. Printing of a selected design 12 may employ normal procedures of multi-color offset printing. Film 13 protects the water soluble slip layer 16 against any wetting agent to which the paper 18 may be exposed during the printing process and protects the paper 18 against curling from exposure to printing agents. Pressure sensitive adhesive 14 is next applied over the printed design. A preferred adhesive is an aqueous emulsion of vinyl-acrylic copolymer, and a variety of suitable adhesives are commercially available. It is important that the adhesive layer 14 be uniform, and it has been found that an adhesive layer 14 having superior characteristics in the present relation is secured by application of the emulsion by a silk screen procedure. The adhesive is deposited in a thin, extremely uniform substantially invisible layer, which, after drying, does not cause perceptible visual interference between the design and the surface to which the tattoo is secured.

To apply the finished tattoo 10, tattoo 10 is detached from the hang-tag 2, and water is applied to the decal paper 18 to wet it and to soften or dissolve the slip layer 16. The decal paper 18 and any residue is removed, leaving the design 12 in place.

Although the above-described tattoo 10 is that presently preferred for use in the present invention, it should be understood that other tattoo constructions may serve as well and are considered to be within the spirit and scope of the present invention.

Figure 4:
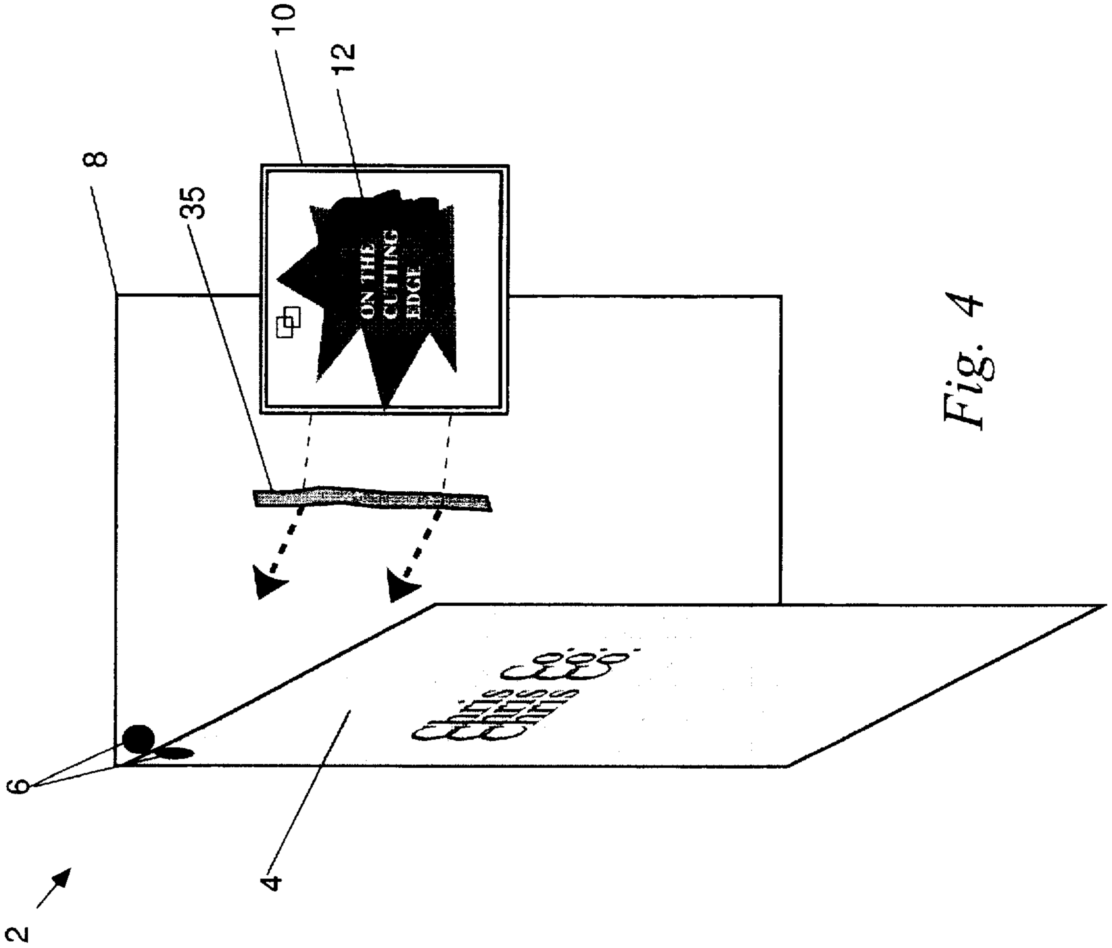
FIG. 4 is a perspective view illustrating the preferred manner of attaching the temporary tattoo 10 to the hang-tag 2.

FIG. 4 is a perspective view illustrating the preferred manner of attaching the temporary tattoo 10 to the hang-tag 2. The tattoo 10 is attached via its base piece of decal paper 18 to one side 8 of the interior of hang-tag 2 using the above-described reattachable bonding agent 35. Preferably, the reattachable bonding agent 35 is applied to the back side of the decal paper 18 along one edge for removably attaching that edge of the removable tattoo 10 to the cardboard panel 8. The bonding agent may be applied linearly (as shown), or at one or more points along the edge of the decal paper 18. The bonding agent may also be applied directly to the cardboard panel 8, or it may be provided separately as a strip of tape for insertion between the decal paper 18 and panel 8. In all cases, this edgewise application makes it possible to raise the opposing free end of the tattoo 10 while the bonded edge remains attached to the cardboard panel 8. With a folding hang-tag, it is suggested that the bonding agent is best applied along the inside edge to give the adhesive some protection from the fold. However, this is more a matter of design choice. Additional printed subject matter can be included on the panel 8 but underneath the tattoo 10, and this information is obscured by the tattoo but is revealed when the opposing free end of the tattoo 10 is raised. This is well-suited for displaying certain types of information, e.g., tattoo application instructions, tattoo collector series information, etc. Such information has more visual impact and is more closely associated with the tattoo when is positioned therebeneath to be uncovered by lifting of the tattoo 35. Moreover, the edgewise application of bonding agent is important inasmuch as the tattoo can be more easily removed from the panel 8 without destroying the tattoo or the underlying print.

Figure 5:
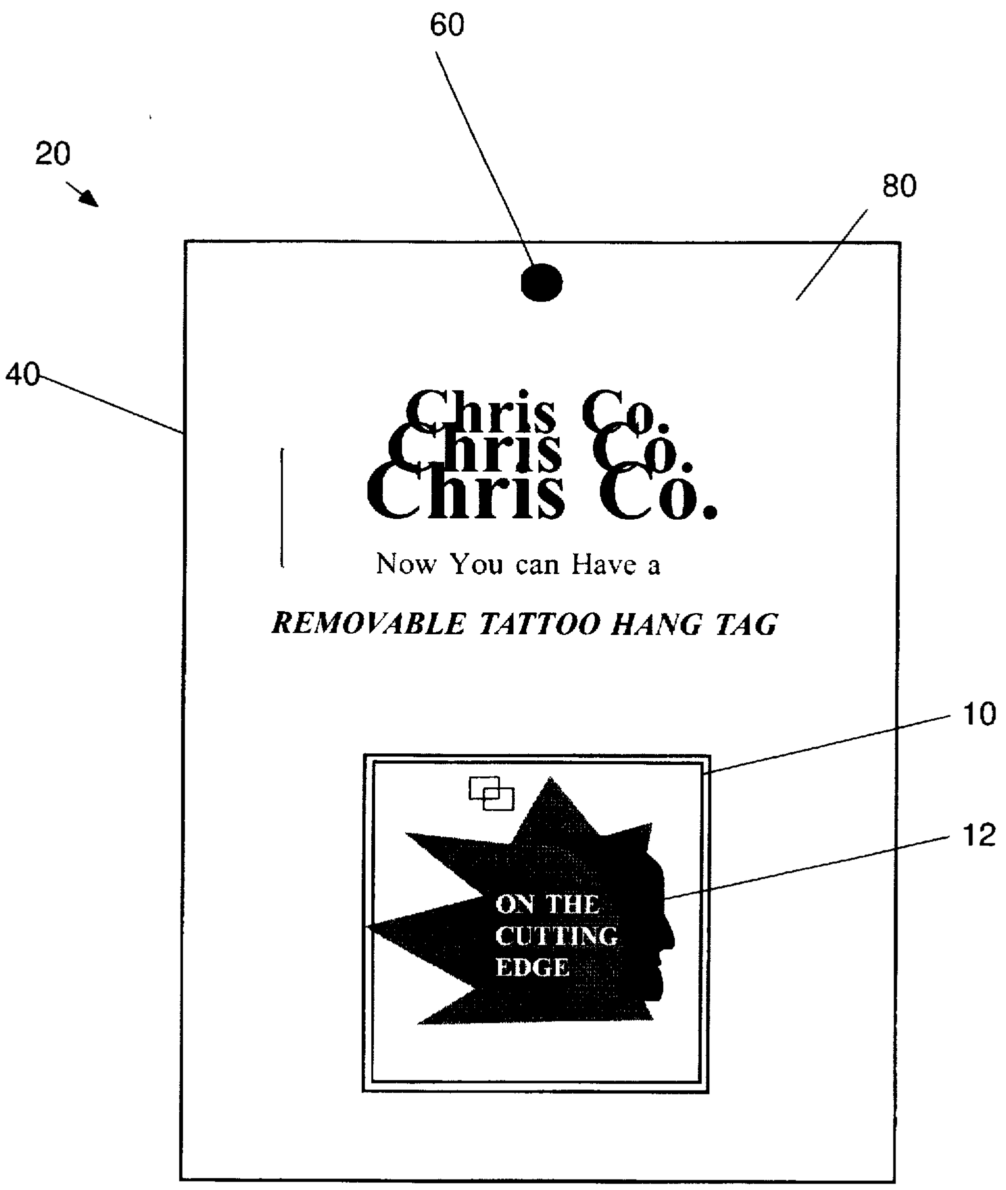
FIG. 5 is a front perspective view of an exemplary single-ply hang-tag 2 with integral temporary tattoo 10 according to a second embodiment of the present invention.

FIG. 5 is a front perspective view of an exemplary single-ply hang-tag 20 with integral temporary tattoo 10 according to a second embodiment of the present invention. In this embodiment, the hang-tag 20 is a single sheet of card-stock (not folded). The front panel 40 may be printed and/or embossed (as shown) to convey promotional information, consumer product information, and/or pricing information. The tag 20 is perforated with holes 60 through the upper margin to allow the tag 20 to be hung from the intended product by a "swifttack" (i.e., a looped plastic fastener applied by a gun), or a string or cord threaded through the top of the tag. Once again, the hang-tag 20 and the information borne on it are provided by the manufacturer of the product to which the hang-tag 20 will be attached. Again, the identity of the retailer generally is not known until the product is packaged, and most printed promotional information is specific to the manufacturer. The same need exists for an economical way of giving the retailer an opportunity to add promotional information. These and other above-described objects are accomplished by incorporating the same removable tattoo 10 bearing a second design such as the retailer's logo 12.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. A promotional hang-tag with integral removable tattoo, comprising:

- a cardboard sheet having at least one surface bearing printed subject matter, said cardboard sheet being defined by at least one through hole to allow said sheet to be hung from an intended product by a swifttack, string or cord threaded through the top of the tag;
- a removable tattoo displaying secondary printed matter, said tattoo further comprising,
  - a panel of porous decal paper,
  - a water soluble slip layer carried on one side of said porous decal paper,
  - a water resistant film carried on said water soluble slip layer,
  - secondary printed matter on said water resistant film, and
  - a layer of pressure sensitive adhesive covering the secondary printed matter; and
- a reattachable bonding agent applied to the other side of said porous decal paper along an edge thereof for removably attaching said edge of said removable tattoo to said cardboard sheet, the attached tattoo thereby obscuring at least a portion of the printed subject matter until removed;

whereby said cardboard sheet is intended for conveying product information, and said removable tattoo, which may be removed and applied elsewhere to generate further publicity, adds the capability of conveying supplemental information such as retailer advertising.

2. The promotional hang-tag with integral removable tattoo according to claim 1, wherein said cardboard sheet is a single-ply card having a front panel bearing said printed subject matter.

3. The promotional hang-tag with integral removable tattoo according to claim 1, wherein said cardboard sheet is a folded card having a front panel bearing said printed subject matter, and an interior panel for attaching said removable tattoo.

4. The promotional hang-tag with integral removable tattoo according to claim 3, wherein said folded card is defined by two through holes which are aligned when said card is folded to allow said sheet to be hung from an intended product by a swifttack, string or cord threaded through the top of the tag.

5. The promotional hang-tag with integral removable tattoo according to claim 1, wherein said secondary printed matter comprises a multi-color offset print graphic printed on said water resistant film.

6. The promotional hang-tag with integral removable tattoo according to claim 5, wherein said slip layer corresponds to an area occupied by said graphic.

7. The promotional hang-tag with integral removable tattoo according to claim 6, wherein said water resistant film covers substantially the entire area of said decal paper.

8. The promotional hang-tag with integral removable tattoo according to claim 7, wherein said water resistant film is matte surfaced.

* * * * *